United States Patent [19]

Bender

[11] Patent Number: 4,523,771
[45] Date of Patent: Jun. 18, 1985

[54] DRAWBAR APPARATUS

[76] Inventor: Harold C. Bender, Rte. 1, Poseyville, Ind. 47633

[21] Appl. No.: 453,608

[22] Filed: Dec. 27, 1982

[51] Int. Cl.³ .............................................. B60D 1/14
[52] U.S. Cl. ................................... 280/474; 172/677; 280/408; 280/410; 280/446 A; 280/461 R; 280/492
[58] Field of Search ............... 280/474, 400, 418, 439, 280/446 A, 446 R, 456 R, 456 A, 461 R, 484, 485, 486, 489, 492, 408, 409, 410, 411 R, 412; 172/445, 448, 678, 699, 677, 679, 680; 37/193; 299/36; 405/181; 213/1 R

[56] References Cited

U.S. PATENT DOCUMENTS 2,849,073 8/1958 Gaspardo ........................ 280/408 X
3,724,874 4/1973 Simpson .............................. 280/408

FOREIGN PATENT DOCUMENTS 459574 5/1928 Fed. Rep. of Germany ...... 280/410

Primary Examiner—Joseph F. Peters, Jr.
Assistant Examiner—Mitchell J. Hill
Attorney, Agent, or Firm—Woodard, Weikart, Emhardt & Naughton

[57] ABSTRACT

A drawbar apparatus for use in a wheeled fertilizer tank which is normally coupled between a tractor and a planter. The drawbar apparatus includes a housing integral with the chasis of the wheeled fertilizer tank and a drawbar pivotally attached at the front end of the housing adjacent the coupling to the tractor. The drawbar extends between the front and rear ends of the wheeled fertilizer tank and includes a coupling means at the rear end for coupling to the planter. The housing includes a guide means for limiting the verticle and lateral movement of the drawbar. The drawbar pivots relative to the wheeled fertilizer tank in response to relative tilting between the tractor and the wheeled fertilizer tank, thus permitting the planter to dig a furrow having a constant depth as variations in terrain are negotiated.

7 Claims, 5 Drawing Figures

DRAWBAR APPARATUS

BACKGROUND OF THE INVENTION

The invention relates generally to the field of draft appliances for vehicles and, more particularly, to draft appliances which are suitable for agricultural uses, such as between a tractor and a pulled farm implement.

When a tractor is used to pull a typical farm implement, such as a planter or plow, over a field in order to perform normal farming operations, it is important to keep the planter in a level or untilted position with respect to the ground. For example, if the planter is tilted the resulting furrow will be uneven in depth, which for planting purposes is an undesirable condition. As long as the tractor and planter are not tilted with respect to each other, an incline or decline may be traversed without problem. However, when the tractor and planter are tilted relative to each other, the pulling action of the tractor will tend to tilt the planter with respect to the ground immediately below it. The result is that during the periods of relative tilt between the tractor and the planter, the furrow will be either deeper or more shallow than is desirable. Since a desirable furrow may be only several inches deep, relatively shallow grades can produce significant changes in the depth of the furrow. Thus, even though a typical field will not have any abrupt changes in slope, most fields will have slope changes significant enough to prevent an even depth furrow to be dug by the planter when normal equipment is used.

The following list of references disclose devices which apparently offer certain improvements in couplings between vehicles.

| U.S. Pat. No. | Inventor |
| --- | --- |
| 1,908,711 | Kuchar |
| 1,259,205 | Bessesen |
| 2,011,817 | Littlefield |
| 1,796,087 | Day et al. |
| 2,168,148 | Arehart |
| 1,356,270 | De Saunier |
| 1,267,561 | Lapham |

The above devices all provide couplings which permit a certain amount of flexibility so that lateral and torsional forces exerted upon the couplings will not easily break it, and also a shock absorbing effect is produced at the coupling. None of these couplings however provide any structure which is adaptable to farm equipment for ensuring an even depth of the furrow when the tractor and planter are tilted with respect to each other.

U.S. Pat. No. 2,159,253 to Bush discloses a trailer hitch which is presumably designed to provide control over certain relative movements between the transporting vehicle and the trailer, especially those movements which occur during backing of the trailer preparatory to parking. The structure however, is not adaptable to controlling or compensating for forces exerted on a coupling which tend to cause a planter to dig an uneven furrow.

U.S. Pat. No. 2,710,514 to Broussard discloses a coupling device which attempts to solve problems caused by relative tilt between a tractor and a pulled vehicle or implement. Thus, Broussard discloses an implement tongue and track assembly which apparently permits a pulled vehicle to ride over steep inclines and obstructions without an upward movement of the coupling. This device however, is not able to correct tilting problems so as to permit digging a furrow having a constant depth.

U.S. Pat. No. 3,032,903 to Ede discloses a supporting linkage arrangement for a mole plow which presumably enables the mole to operate in floating equilibrium at a constant depth relative to the vehicle. This device however, is not adaptable for use on a pulled vehicle, such as a planter, in order to provide a constant depth furrow when the tractor and pulled vehicle are tilted relative to each other.

Accordingly, it is an object of the present invention to provide an improved drawbar apparatus which is suitable for use between a planter and tractor for permitting a planter to dig a furrow having a constant depth.

SUMMARY OF THE INVENTION

One embodiment of the present invention is characterized by a drawbar apparatus in a first pulled vehicle which is adapted to be coupled between a tow vehicle and a second pulled vehicle. The drawbar apparatus includes a housing which is attached to the first pulled vehicle and a drawbar having two ends and extending substantially between the front and rear ends of the first pulled vehicle. One end of the drawbar is pivotally attached to a horizontal pivot at the front end of the first pulled vehicle while the other end of the drawbar includes a coupling means for coupling the first pulled vehicle to the second pulled vehicle. The drawbar pivots substantially independent of the first pulled vehicle in response to relative tilting between the tow vehicle and the second pulled vehicle.

Accordingly, it is an object of the present invention to provide an improved drawbar apparatus which is suitable for use between a planter and a tractor in order to permit the planter to dig a furrow having a constant depth despite relative tilting between the tractor and the planter.

This and other objects and advantages of the present invention will become more apparent in the following figures and detailed description.

DESCRIPTION OF THE PREFERRED EMBODIMENT

Figure 1:
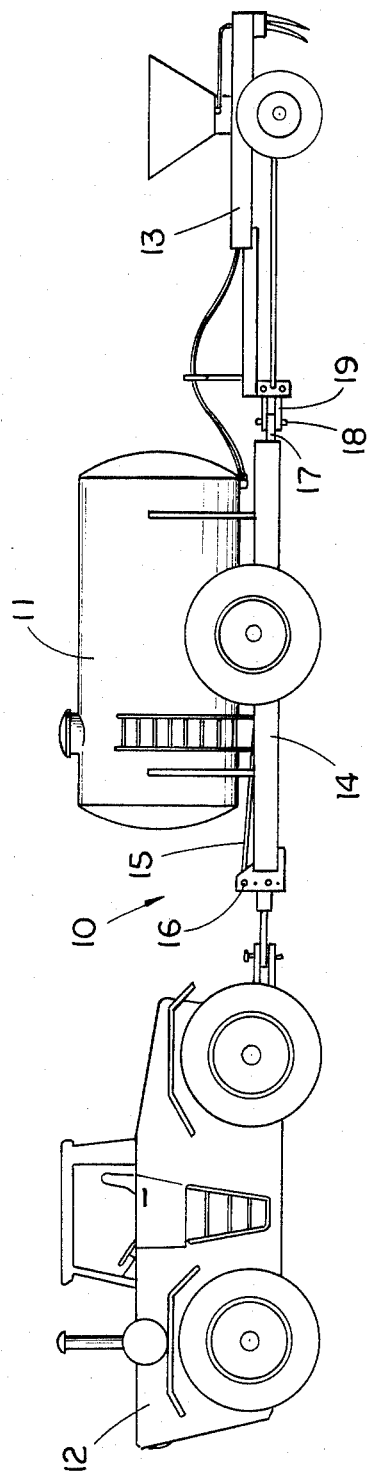
FIG. 1 is a side elevation view of a wheeled fertilizer tank including the drawbar apparatus of the present invention and coupled between a tractor and planter of conventional construction.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 shows the drawbar apparatus of the present invention generally designated at 10 affixed to a wheeled fertilizer tank 11. Tank 11 is shown coupled at its front end to tractor 12 and at its rear end to planter 13. Tractor 12 and planter 13 may be of any conventionally known type and no further description of their construction is necessary.

Drawbar apparatus 10 includes a housing 14, which is integral with the under carriage or chassis of tank 11, and a drawbar 15 which extends substantially the entire distance between the front and rear ends of tank 11. Drawbar 15 is pivotally attached at its front end to housing 14 by rod 16, which is in turn horizontally received within housing 14. Drawbar 15 extends rearwardly from rod 16 to rear coupling end 17. Vertical pin 18 connects rear coupling end 17 to a clevis type coupling 19 of conventional construction and which is attached to planter 13.

Figure 2:
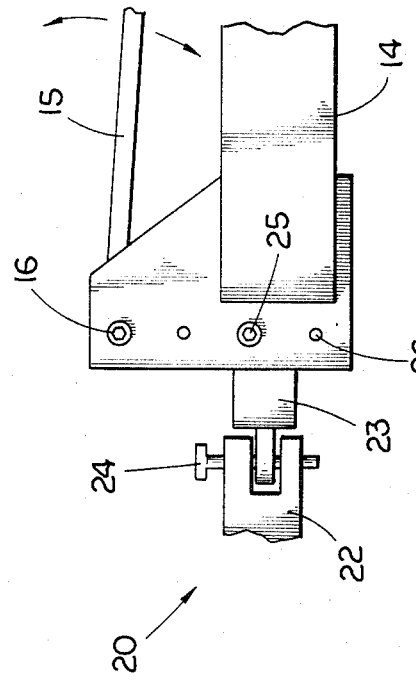
FIG. 2 is a fragmentary side elevation view of the front end portion of the drawbar apparatus of the present invention and showing the coupling between the tractor and the wheeled fertilizer tank.

FIG. 2 shows the front portion of drawbar apparatus 10 and the coupling between tank 11 and tractor 12 in more detail. The coupling between tractor 12 and tank 11 is generally designated at 20, and consists of a clevis 22 attached to and extending from the rear portion of tractor 12, coupling member 23 and vertical pin 24. Coupling member 23 is received within clevis 22 and pivotally attached thereto by pin 24. Coupling member 23 is, in turn, pivotally attached to the front most portion of housing 14 by bolt 25. A series of vertically spaced apart apertures 26 permit the coupling between tractor 12 and tank 11 to be vertically adjusted. In a similar manner, the point of attachment between drawbar 15 and housing 14 may also be vertically adjusted. Thus, as seen in FIG. 2, it is possible to lower the point of pivotal attachment between drawbar 15 and housing 14 if desired for any reason.

Figure 3:
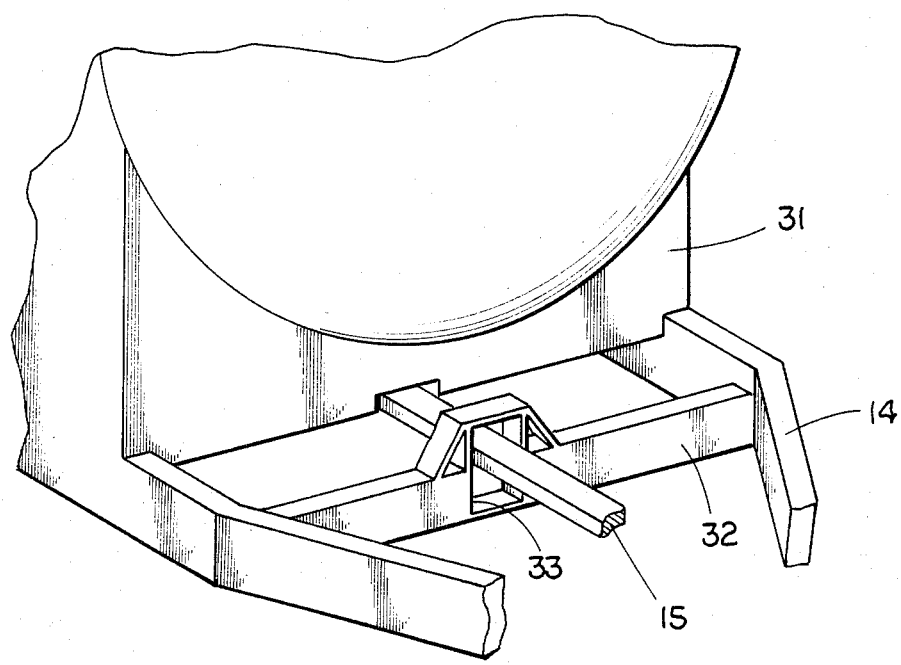
FIG. 3 is a fragmentary perspective view showing a portion of the drawbar apparatus of the present invention which is rearward of the coupling between the tractor and the wheeled fertilizer tank.

FIG. 3 shows a portion of drawbar 15 extending rearwardly beneath tank support structure 31. Cross support 32 of housing 14 has been modified to provide a clearance space 33 to accommodate the pivotal movement of drawbar 15.

Figure 4:
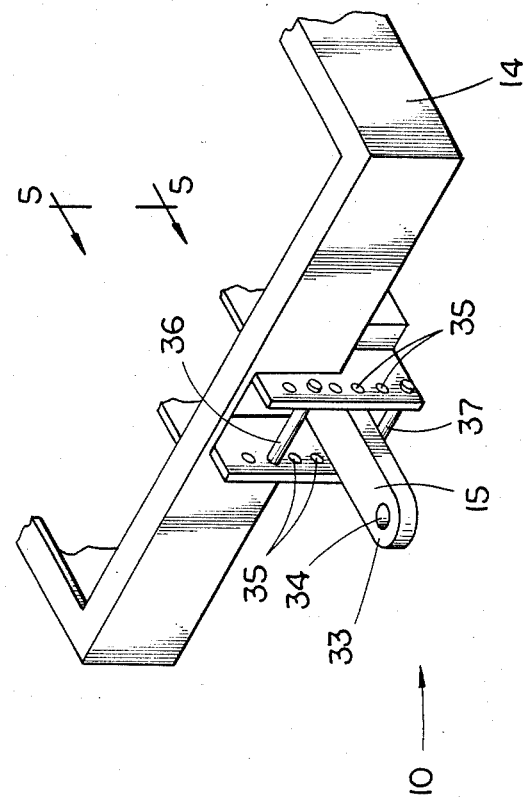
FIG. 4 is a fragmentary perspective view showing the rear most portion of the drawbar apparatus of the present invention.

FIG. 4 shows the rear most portion of drawbar apparatus 10 of the subject invention. Drawbar 15 extends rearwardly of the rear most portions of housing 14 and forms a rear coupling end 33 which includes vertical aperture 34. Two series of vertically spaced-apart and horizontally aligned apertures 35 on either side of drawbar 15 receive horizontal bars 36 and 37 at different vertical heights. Horizontal bars 36 and 37 provide vertical limits for the pivotal movement of drawbar 15 and may be adjusted by varying the heights of horizontal bars 36 and 37.

Figure 5:
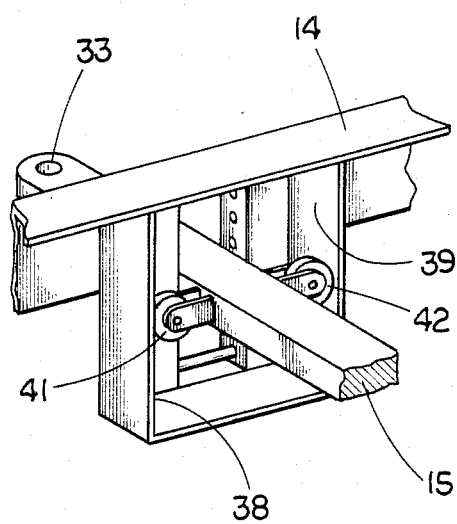
FIG. 5 is a fragmentary perspective view of the hidden side of that portion of the drawbar apparatus which is shown in FIG. 3, and illustrating the guide means of the drawbar apparatus.

Referring now to FIG. 5, it is seen that housing 14 includes a pair of upright wall surfaces 38 and 39 which serve to limit the lateral movement of drawbar 15. A pair of guide rollers 41 and 42 are oppositely attached on either side of drawbar 15 and bear upon the corresponding vertical wall surfaces 38 and 39 to facilitate smooth pivotal movement of drawbar 15.

It is to be appreciated that drawbar 15 pivots substantially independent of any relatively tilting between wheeled fertilizer tank 11 and planter 13. The independent movement of drawbar 15 is, of course, limited in a vertical direction by horizontal bars 36 and 37. Thus, as tractor 12 is towing wheeled fertilizer tank 11 and planter 13 during normal planting operations it is possible for planter 13 to dig a furrow having a constant depth even though typically encountered minor variations in terrain cause relative tilting between wheeled fertilizer tank 11 and planter 13.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. In a first pulled vehicle normally coupled between a tow vehicle and a second pulled vehicle, a draw bar apparatus, comprising:
   a housing attached to said first pulled vehicle; and
   a draw bar having two ends and extending substantially between the front and rear ends of said first pulled vehicle, said one end of said draw bar attached for vertical pivotal movement to a pivot adjacent the front end of said housing, the other end of said draw bar including coupling means for coupling to said second pulled vehicle, said draw bar pivoting relative to said first pulled vehicle in response to relative tilting in a vertical plane between said second pulled vehicle and said first pulled vehicle.

2. The apparatus of claim 1 wherein said pivot is adjacent to, but independent of, the coupling between said tow vehicle and said first pulled vehicle.

3. The apparatus of claim 1 wherein said housing includes a guide means for limiting the lateral and vertical movement of said draw bar.

4. The apparatus of claim 3 wherein said guide means includes a pair of upright walls integral with said housing, said upright walls defining a vertical channel for receiving therethrough said draw bar, said upright wall, limiting the lateral movement of said drawbar.

5. The apparatus of claim 4 wherein said guide means further includes a pair of horizontal bars vertically spaced apart within said channel, said bars serving to limit the vertical travel of said draw bar.

6. The apparatus of claim 5 wherein said upright walls each define a series of vertically spaced apart and horizontally aligned apertures for receiving said bars horizontally at different heights in order that the vertical travel limits of said draw bar may be adjusted.

7. The apparatus of claim 5 and further comprising:
   a plurality of rollers oppositely attached on either side of said draw bar, said rollers movable vertically on said pair and facilitating smooth movement of said draw bar within said channel.

* * * * *